No. 740,468. Patented October 6, 1903.

UNITED STATES PATENT OFFICE.

CHRISTOPHER RIS AND ALBERT MYLIUS, OF BASLE, SWITZERLAND, ASSIGNORS TO ANILINE COLOUR AND EXTRACT-WORKS, FORMERLY JOHN R. GEIGY, OF BASLE, SWITZERLAND.

ACRIDIN DYE AND PROCESS OF MAKING SAME.

SPECIFICATION forming part of Letters Patent No. 740,468, dated October 6, 1903.

Application filed July 28, 1903. Serial No. 167,314. (Specimens.)

*To all whom it may concern:*

Be it known that we, CHRISTOPHER RIS and ALBERT MYLIUS, citizens of Switzerland, and residents of Basle, Switzerland, have invented certain new and useful Improvements in Acridin Dyes and Processes of Making Same, of which the following is a specification.

The present invention relates to the production of basic dyestuffs of the acridin series, especially useful for dyeing cotton or leather mordanted with tannin in orange-yellow, reddish-orange to brown shades, which are to be obtained in a general manner by melting formylated aromatic bases together with a metadiamin and a salt of a base, such as salts of ammonia or of organic bases, the latter serving as agents of condensation.

As formylated bases which may be used for the process, we cite the following: mono or di formylmetaphenylenediamin, mono or di forlylmetatoluylenediamin, formylated alkyl derivates of these metadiamins, formanilid and its homologues, formyl compounds of monoalkylanilins and of their homologues, formylated naphthylamins, formyl derivatives of amidophenol ethers, of paradiamins, and of the bases of the benzidin series. However, we do not confine ourselves to this enumeration, because the reaction is of a rather general applicability. All these compounds furnish when brought into reaction with the same metadiamin compound very similar dyestuffs. The metadiamins which may especially be used are the following: metaphenylenediamin, metatoluylenediamin, and their alkyl derivatives. The first named gives brownish-yellow to brown shades, the second orange-yellow shades, while their alkyl derivates turn to reddish-orange. Concerning the third component of the reaction it is to be observed that the different agents of condensation—viz., salts of bases—do not produce an essentially different result. As useful salts we cite the following, for instance: chlorhydrate of ammonia, anilinchlorhydrate, chlorhydrates of toluidins, of naphthylamins, and of metadiamins, as well as other salts of these bases, such as sulfates.

We cannot give an exact formula showing the constitution of the new coloring-matters. However, they are different from the known acridin yellow (the formation of which might have been presumed) by a much redder shade, easier solubility, and a weaker fluorescence of their solutions.

The following is an expression of our reaction: Formylated base + metadiamin + salt of a base gives $NH_3 + HO_2 +$ base + salt of an acridin dye.

Example I: 17.8 kilos of diformylated metatoluylenediamin, 24.4 kilos of metatoluylenediamin, and 21 kilos of chlorhydrate of anilin are melted together and heated gradually to about 180° centigrade till the mass becomes viscous and an augmentation of the intensity of the color can no more be observed. The mass is then left to cool and is finely pulverized. It may directly be employed for dyeing purpose, or purified by dissolving the same with boiling water, filtered and evaporated to dryness. The dyestuff forms a brown powder, easily soluble in water with an orange color, easily soluble in alcohol showing a yellowish-green fluorescence, insoluble in ether and benzene, soluble in concentrated sulfuric acid with a dull yellow color. The watery solution is precipitated by alkalies in light-brown flakes. The coloring-matter dyes cotton mordanted with tannin or leather in yellowish-orange shades of great fastness.

Example II: 24.2 kilos of formanilid, forty-four kilos of metaphenylenediamin, and forty kilos of salmiac salt are heated together at about 200° to 210° centigrade till the formation of the coloring-matter will be finished. The dyestuff forms a dark-brown powder, soluble in water with an orange-brown color, from which the base of the color is precipitated by alkalies in brown flakes. The dyestuff is also easily soluble in alcohol with orange-color and dull-greenish fluorescence. It is insoluble in ether and benzene, soluble in concentrated sulfuric acid with violet-brown color. It dyes tannin-mordanted cotton and leather fast-brown shades.

Example III: 17.8 kilos of diformylated metatoluylenediamin, 27.2 kilos of metaamidodimethylanilin, and twenty-one kilos of chlorhydrate of anilin are melted at about 180° to 200° centigrade and maintained at this temperature till no augmentation of the formation of color may be observed. The dyestuff dissolves in water with orange color, precipitated by alkalies in orange-yellow flakes, soluble in alcohol with orange color and green fluorescence, insoluble in ether and benzene, soluble in concentrated sulfuric acid with light-yellow color. It dyes reddish-orange shades.

The described process may be carried out in an enameled-iron vessel furnished with a stirring mechanism and placed in an oil-bath.

We claim—

1. The process for the production of orange to brown acridin dyestuffs by melting a formylated aromatic base together with a meta-diamin compound and with a salt of a base, substantially as described.

2. As new articles of manufacture the thus-obtained orange to brown acridin dyestuffs, forming brown powders, which are soluble in water with orange to orange-brown color precipitated by alkalies in brownish to orange flakes, soluble in alcohol with orange color and greenish fluorescence, insoluble in ether and benzene, soluble in concentrated sulfuric acid and dyeing tannin-mordanted cotton and leather in orange to brown shades, substantially as described.

In testimony whereof we have signed our names to this specification in the presence of two subscribing witnesses.

CHRISTOPHER RIS.
ALBERT MYLIUS.

Witnesses:
ALBERT GRAEBER,
GEO. GIFFORD.